United States Patent
Tanahashi et al.

(10) Patent No.: US 10,024,284 B2
(45) Date of Patent: Jul. 17, 2018

(54) FEED SYSTEM OF LUBRICATING OIL OR FUEL OF VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 103 days.

(21) Appl. No.: 14/945,764

(22) Filed: Nov. 19, 2015

(65) Prior Publication Data

US 2016/0208748 A1 Jul. 21, 2016

(30) Foreign Application Priority Data

Jan. 19, 2015 (JP) ................................. 2015-007559

(51) Int. Cl.
*F01M 1/02* (2006.01)
*F02M 37/22* (2006.01)
*B60K 15/03* (2006.01)

(52) U.S. Cl.
CPC ............. *F02M 37/22* (2013.01); *B60K 15/03* (2013.01); *B60K 2015/03401* (2013.01)

(58) Field of Classification Search
CPC ............................ B01D 2201/50; B60R 16/06
USPC ................. 123/196 R; 361/212, 215, 216
See application file for complete search history.

(56) References Cited

U.S. PATENT DOCUMENTS

| 3,255,771 | A | 6/1966 | MacSpadden |
|---|---|---|---|
| 3,597,668 | A | 8/1971 | Yoshimine |
| 3,922,214 | A | 11/1975 | Van Cakenberghe |
| 4,795,935 | A | 1/1989 | Fujii et al. |
| 5,095,400 | A | 3/1992 | Saito |
| 5,382,359 | A | 1/1995 | Brandt |
| 6,168,713 | B1 * | 1/2001 | Sekine ................. B01D 29/055 210/172.3 |

(Continued)

FOREIGN PATENT DOCUMENTS

| JP | S50-026778 | 3/1975 |
|---|---|---|
| JP | S61-194999 | 8/1986 |

(Continued)

OTHER PUBLICATIONS

Office Action issued in U.S. Appl. No. 15/018,085 dated Dec. 14, 2016.

(Continued)

*Primary Examiner* — Marguerite McMahon
*Assistant Examiner* — James Kim
(74) *Attorney, Agent, or Firm* — Hunton Andrews Kurth LLP

(57) ABSTRACT

In a tank which stores lubricating oil or fuel therein, a strainer for lubricating oil or fuel is arranged at the bottom portion of the inside of the tank. The tank and the lubricating oil or fuel which is stored in the tank carry a positive charge. A self-discharge type static eliminator is placed on the outer surface of the bottom floor of the tank which corresponds to the back side of the inside surface of the tank which faces the strainer to thereby eliminate static electricity from the lubricating oil or fuel which flows into the strainer by the self-discharge type static eliminator.

12 Claims, 3 Drawing Sheets

(56) References Cited

U.S. PATENT DOCUMENTS

| | | | |
|---|---|---|---|
| 6,207,592 B1* | 3/2001 | Nickell | B29C 47/0019 442/62 |
| 6,223,731 B1* | 5/2001 | Yoshiume | F02D 41/1401 123/456 |
| 6,235,385 B1 | 5/2001 | Lee | |
| 6,589,420 B1* | 7/2003 | Mathew | B01D 27/005 210/243 |
| 7,248,454 B2 | 7/2007 | Takayanagi | |
| 7,467,549 B2* | 12/2008 | Forgue | B01D 35/26 123/509 |
| 7,527,042 B2* | 5/2009 | Crary | F02M 37/106 123/198 D |
| 7,684,169 B1 | 3/2010 | Larkin | |
| 7,832,528 B1 | 11/2010 | Liang | |
| 7,971,689 B2 | 7/2011 | Moore | |
| 8,372,278 B1* | 2/2013 | Nguyen | B01D 35/0273 123/196 A |
| 8,503,154 B2 | 8/2013 | Nakai | |
| 9,044,916 B2* | 6/2015 | Koike | B32B 7/06 |
| 2002/0179311 A1* | 12/2002 | Alper | B60R 16/06 174/55 G |
| 2003/0131828 A1 | 7/2003 | Crary | |
| 2003/0183465 A1 | 10/2003 | Ikeda | |
| 2004/0231730 A1* | 11/2004 | Nakamura | B60K 15/03 137/565.16 |
| 2005/0018375 A1* | 1/2005 | Takayanagi | H01T 23/00 361/212 |
| 2008/0036241 A1 | 2/2008 | Aisenbrey | |
| 2008/0099595 A1* | 5/2008 | Lewis | A47K 10/3687 242/560 |
| 2012/0039012 A1 | 2/2012 | Nakai | |
| 2014/0120293 A1* | 5/2014 | Gupta | H01L 21/6836 428/41.7 |
| 2016/0059838 A1 | 3/2016 | Yamada et al. | |
| 2016/0108868 A1 | 4/2016 | Tanahashi et al. | |
| 2016/0177811 A1 | 6/2016 | Tanahashi et al. | |
| 2016/0186639 A1 | 6/2016 | Tanahashi | |
| 2016/0186703 A1 | 6/2016 | Tanahashi et al. | |
| 2016/0200270 A1 | 7/2016 | Tanahashi et al. | |
| 2016/0214453 A1 | 7/2016 | Tanahashi | |
| 2016/0223024 A1 | 8/2016 | Tanahashi et al. | |
| 2016/0230824 A1 | 8/2016 | Tanahashi et al. | |
| 2016/0280162 A1 | 9/2016 | Yamada et al. | |

FOREIGN PATENT DOCUMENTS

| | | |
|---|---|---|
| JP | H05-238438 A | 9/1993 |
| JP | 2000-013280 A | 1/2000 |
| JP | 2001-355524 A | 12/2001 |
| JP | 2002-104106 A | 4/2002 |
| JP | 2003-312277 A | 11/2003 |
| JP | 2006234093 A | 9/2006 |
| JP | 2008181694 A | 8/2008 |
| JP | 2009-024361 A | 2/2009 |
| JP | 2009-208882 A | 9/2009 |
| JP | 2010192177 A | 9/2010 |
| JP | 2010-236464 A | 10/2010 |

OTHER PUBLICATIONS

US Patent and Trademark Office, Final Office Action in U.S. Appl. No. 15/018,085, dated Jun. 7, 2017, 26 pages.

US Patent and Trademark Office, Notice of Allowance in U.S. Appl. No. 15/018,085, dated Oct. 20, 2017, 7 pages.

U.S. Patent and Trademark Office, Corrected Notice of Allowability dated Dec. 14, 2017 in U.S. Appl. No. 15/018,085, 4 pages.

U.S. Patent and Trademark Office, Corrected Notice of Allowability dated Jan. 9, 2018 in U.S. Appl. No. 15/018,085, 4 pages.

U.S. Patent and Trademark Office, Corrected Notice of Allowability dated Feb. 2, 2018 in U.S. Appl. No. 15/018,085, 4 pages.

* cited by examiner

FEED SYSTEM OF LUBRICATING OIL OR FUEL OF VEHICLE

CROSS-REFERENCE TO RELATED APPLICATION

The present application claims priority to Japanese Patent Application No. 2015-007559 filed on Jan. 19, 2015, which is incorporated herein by reference in its entirety.

TECHNICAL FIELD

Embodiments of the present invention relate to a feed system of lubricating oil or fuel of a vehicle.

BACKGROUND ART

Known in the art is a vehicle in which a discharge antenna or other discharge device is attached to an engine of a vehicle or a member related to an engine to discharge and release to the outside the high voltage electricity, static electricity, etc. which is generated or stored at the engine part and thereby improve the fuel economy (for example, see Japanese Patent Publication No. 5-238438A)

SUMMARY

Technical Problem

As described in the above Japanese patent literature, it has been known that vehicles carry static electricity and that this static electricity has some sort of effect on vehicle operation. However, what kind of effect this static electricity has on the operation of a vehicle and the specific reason for that effect are not well known. Without a full understanding of the effects of static electricity, which is carried in a vehicle, has on the operation of the vehicle, it is not possible to suitably cope with static electricity which the vehicle carries.

Therefore, the inventors focused on the feed system of lubricating oil or fuel of vehicles in particular and investigated what kind of effect static electricity which a vehicle carries has on the feed system of lubricating oil or fuel of vehicles and the specific reasons for these effects. As a result of their investigation, the inventors discovered that if a vehicle is charged with static electricity, the viscosity of the lubricating oil or fuel rises and affects the operating response of the engine and discovered a suitable method of eliminating static electricity which is required for improving the engine operating response.

Solution to Problem

That is, according to embodiments of the present invention, there is provided a feed system of lubricating oil or fuel of a vehicle including a tank which stores a lubricating oil or fuel, a strainer for lubricating oil or fuel, which is arranged at a bottom portion of the tank, and the tank and the lubricating oil or fuel which is stored in the tank carrying a positive charge. A self-discharge type static eliminator which can discharge a positive carried charge to air is placed on an outside surface of a bottom wall of the tank which corresponds to a back side of an inside surface of the bottom wall of the tank which faces said strainer to thereby eliminate static electricity from lubricating oil or fuel which flows into said strainer by said self-discharge type static eliminator.

Advantageous Effects of Embodiments of the Invention

It is possible to remarkably improve the operating response of the engine by eliminating static electricity from the lubricating oil or fuel by the self-discharge type static eliminator to thereby lower the viscosity of the lubricating oil or fuel.

DESCRIPTION OF EMBODIMENTS

Figure 1:
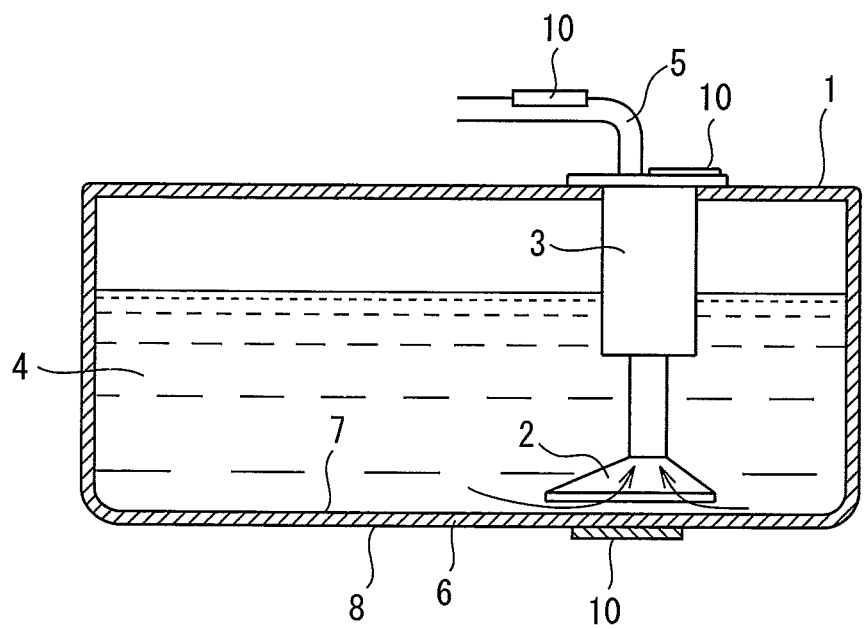
FIG. 1 is a side cross-sectional view of a schematically shown tank of lubricating oil or fuel of a vehicle.

Vehicles mount various shapes and types of lubricating oil tanks and various shapes and types of fuel tanks which differ with each vehicle. The lubricating oil tanks and fuel tanks may differ in shapes and types but these tanks are provided with strainers arranged therein, and further, these tanks are provided with pumps for sucking lubricating oil or fuel inside the tanks through the strainers at the insides or the outsides of the tanks. FIG. 1 shows a typical lubricating oil or fuel tank 1 which is provided with a strainer 2 and pump 3. In the example which is shown in FIG. 1, lubricating oil or fuel 4 is stored in the tank 1, and the strainer 2 is arranged at the bottom portion of the tank 1. Further, in the example which is shown in FIG. 1, the tank 1 is formed from a metal material.

At the time of engine operation, the lubricating oil or fuel 4 inside the tank 1 is sucked through the strainer 2 by the pump 3. Where lubricating oil is stored in the tank 1, the lubricating oil which is sucked through the strainer 2 by the pump 3 is fed through a flow pipe 5 to the engine or automatic transmission. Where fuel is stored in the tank 1, the fuel which is sucked through the strainer 2 by the pump 3 is fed through the flow pipe 5 to the engine. Note that the strainer 2 is arranged near the inside surface 7 of the bottom wall 6 of the tank 1. Therefore, the lubricating oil or fuel 4 inside the tank 1, as shown by the arrows, flows toward the strainer 2 while flowing along the inside surface 7 of the bottom wall 6 of the tank 1 and flows into the inside of the strainer 2.

Now then, if the vehicle is run, the different parts of the tires repeatedly contact and separate from the road surface whereby static electricity is generated. Further, the component parts of the engine and the component parts of the brake system move relative to each other whereby static electricity is also generated. Further, when the vehicle is running, air runs while contacting the outer circumferential surface of the vehicle with friction whereby static electricity is generated as well. Due to the static electricity which is thus generated, the body of the vehicle, engine, etc. carry a charge, and the tank 1 and the lubricating oil or fuel 4 inside the tank 1 also carry a charge. At this time, it has been confirmed that the tank 1 and the lubricating oil or fuel 4 inside the tank 1 carry a positive charge, and further, it has been confirmed that the value of the voltage of the tank 1 and the lubricating oil or fuel 4 inside the tank 1 becomes a high voltage of 1000V or more.

If the lubricating oil or fuel carries a charge, the viscosity of the lubricating oil or fuel rises. As a result, at the time of engine operation, the lubricating oil or fuel is no longer fed to the required locations with a good response. As a result, the operating response of the engine deteriorates. In this case, to prevent the operating response of the engine from deteriorating, the viscosity of the lubricating oil or fuel has to be lowered, and to this end, it is necessary to eliminate the charge which is carried by the lubricating oil or fuel, that is, to eliminate the static electricity of the lubricating oil or fuel.

Figure 2A:
FIGS. 2A and 2B are views which show a self-discharge type static eliminator.
Figure 2B:
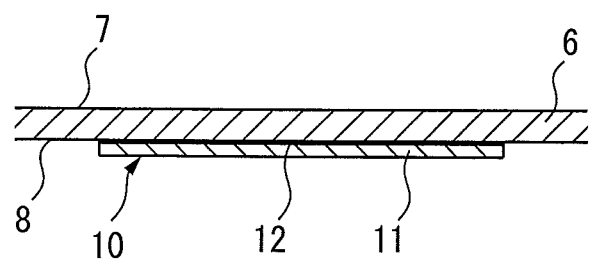

Therefore, the inventors studied simple methods of static elimination for reducing the charge carried at the lubricating oil or fuel and discovered a simple method of static elimination which uses a self-discharge type static eliminator. One example of this self-discharge type static eliminator is shown from FIG. 2A and FIG. 2B. Note that, FIG. 2A shows a plan view of this self-discharge type static eliminator 10, while FIG. 2B shows a side cross-sectional view of this self-discharge type static eliminator 10 when placed on the outside surface 8 of the bottom wall 6 of the tank 1. In the example which is shown in FIG. 2A and FIG. 2B, this self-discharge type static eliminator 10 forms an elongated rectangular planar shape and is comprised of metal foil 11 which is bonded on the outside surface 8 of the bottom wall 6 of the tank 1 by a conductive adhesive 12.

In embodiments of the present invention, as shown in FIG. 1, this self-discharge type static eliminator 10 is placed at the outside surface 8 of the bottom wall 6 of the tank 1. This outside surface 8 corresponds to the back side of the inside surface 7 of the bottom wall 6 that faces the strainer 2. Due to this, static electricity is eliminated from the lubricating oil or fuel. In this case, the mechanism of static elimination by which the self-discharge type static eliminator 10 eliminates the static electricity from the lubricating oil or fuel is not clear, but it guessed that probably the action of discharge of the positive charge from the self-discharge type static eliminator 10 causes elimination of static electricity of the lubricating oil or fuel. Therefore, next, while referring to FIG. 3A which shows an enlarged view of FIG. 2B and FIG. 3B which shows an enlarged view of a portion of the self-discharge type static eliminator 10 shown in FIG. 3A, the mechanism of static elimination which is guessed to occur at the bottom wall 6 of the tank 1 will be explained.

Now, as explained above, in an embodiment according to the present invention, the tank 1 and lubricating oil or fuel 4 carry a positive charge. In this case, in the example which is shown in FIG. 1, as explained above, the tank 1 is formed from a metal material, so the inside of the bottom wall 6 of the tank 1 carries a positive charge. On the other hand, the self-discharge type static eliminator 10, as explained above, comprises metal foil 11 which is bonded on the outside surface 8 of the bottom wall 6 of the tank 1 by the conductive adhesive 12. In this case, both the metal foil 11 and conductive adhesive 12 are conductive, therefore the inside of the metal foil 11, that is, the inside of the self-discharge type static eliminator 10, also carries a positive charge.

Figure 3A:
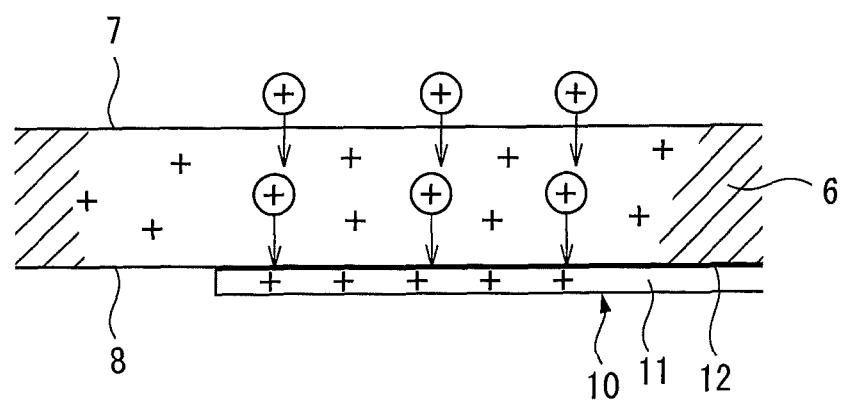
FIGS. 3A and 3B are views for explaining a static elimination action and a self-discharge action.
Figure 3B:
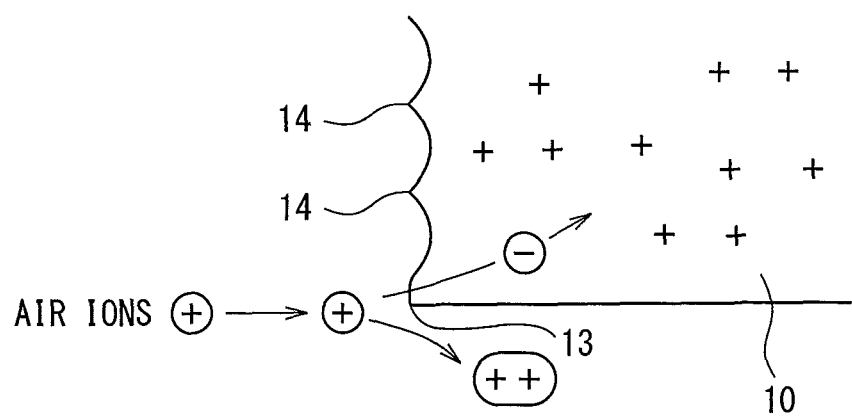

In this regard, the voltage of the self-discharge type static eliminator 10 becomes substantially equal to the voltage of the bottom wall 6 of the tank 1 around the self-discharge type static eliminator 10. Therefore, the voltage of the self-discharge type static eliminator 10 becomes considerably high. On the other hand, air tends to be positively charged. Therefore, as shown in FIG. 3B, part of the air becomes positive air ions (shown by circles with + marks). In this case, if comparing the potential of the air ions and the potential of the self-discharge type static eliminator 10, the potential of the self-discharge type static eliminator 10 becomes considerably higher than the potential of the air ions. Therefore, if the air ion, as shown in FIG. 3B, for example, approaches the corner portion 13 of the self-discharge type static eliminator 10, the field strength between the air ion and the corner portion 13 of the self-discharge type static eliminator 10 becomes higher and, as a result, discharge occurs between the air ion and the corner portion 13 of the self-discharge type static eliminator 10.

If discharge occurs between the air ion and the corner portion 13 of the self-discharge type static eliminator 10, as shown in FIG. 3B, part of the electrons of the air ion moves to the inside of the self-discharge type static eliminator 10, so the amount of positive charge of air ions increases (shown by circles with ++ marks) and the electrons which move through the inside of the self-discharge type static eliminator 10 cause the positive charge carried by the self-discharge type static eliminator 10 to be neutralized. Once the discharge occurs, further discharge easily occurs. If other air ions approach the corner portion 13 of the self-discharge type static eliminator 10, discharge immediately occurs between the air ions and the corner portion 13 of the self-discharge type static eliminator 10. That is, if air around the self-discharge type static eliminator 10 moves, air ions successively approach the corner portion 13 of the self-discharge type static eliminator 10. Therefore, continuous discharge occurs between the air ions and the corner portion 13 of the self-discharge type static eliminator 10.

If discharge continuously occurs between the air ions and the corner portion 13 of the self-discharge type static eliminator 10, the positive charge which is carried at the self-discharge type static eliminator 10 is successively neutralized. As a result, the amount of positive charge which is carried at the self-discharge type static eliminator 10 decreases. If the amount of positive charge which is carried at the self-discharge type static eliminator 10 decreases, the positive charge which is carried in the bottom wall 6 of the tank 1 around the self-discharge type static eliminator 10 moves through the inside of the self-discharge type static eliminator 10. Therefore, the positive charge which is carried on the surface of the bottom wall 6 of the tank 1 around the self-discharge type static eliminator 10 is decreased. If the positive charge which is carried on the surface of the bottom wall 6 of the tank 1 around the self-discharge type static eliminator 10 is decreased, the positive charge which is carried in the bottom wall 6 of the tank 1 away from the self-discharge type static eliminator 10 moves to the surroundings of the self-discharge type static eliminator 10, and as shown in FIG. 3A, the positive charge which is carried by the lubricating oil or fuel 4 (shown by circles with + marks) moves to the inside of the bottom wall 6 of the tank 1 around the self-discharge type static eliminator 10.

In this case, if the amount of the positive charge which is carried in the bottom wall 6 of the tank 1 away from the self-discharge type static eliminator 10 is decreased, the large amount of the positive charge which is carried in the lubricating oil or fuel 4 moves toward the inside of the bottom wall 6 of the tank 1 around the self-discharge type static eliminator 10. As a result, in FIG. 1, the static electricity of the lubricating oil or fuel 4 which flows into the strainer 2 as shown by the arrows is eliminated one by one, and therefore the static electricity of all of the lubricating oil or fuel which is fed out from the pump 3 is eliminated. As a result, the viscosity of the lubricating oil or fuel decreases. Due to this, at the time of engine operation, the lubricating oil or fuel is fed to the required location with good response, so the operating response of the engine is improved.

Note that, even if arranging the self-discharge type static eliminator 10 on the outside surface 8 of the bottom wall 6 of the tank 1 away from the strainer 2, it is possible to eliminate static electricity from the lubricating oil or fuel 4 by the self-discharge type static eliminator 10. However, at this time, static electricity can be eliminated from only part of the lubricating oil or fuel 4 which is present in a limited region of the tank 1, and static electricity cannot be eliminated from the majority of the lubricating oil or fuel 4 which flows into the strainer 2. That is, to eliminate static electricity from all of the lubricating oil or fuel 4 which flows into the strainer 2, the self-discharge type static eliminator 10 has to be placed at the outside surface 8 of the bottom wall 6 of the tank 1 which corresponds to the back side of the inside surface 7 of the bottom wall 6 of the tank 1 which faces the strainer 2.

Therefore, in embodiments of the present invention, there is provided a feed system of lubricating oil or fuel 4 of a vehicle 1 including a tank 1 which stores a lubricating oil or fuel 4; a strainer 2 for lubricating oil or fuel 4, which is arranged at a bottom portion of the tank 1 (the tank 1 and the lubricating oil or fuel 4 which is stored in the tank 1 carrying a positive charge); and a self-discharge type static eliminator 10 which can discharge a positive carried charge to air. The self-discharge type static eliminator 10 is placed on an outside surface 8 of a bottom wall 6 of the tank 1 which corresponds to a back side of an inside surface 7 of the bottom wall 6 of the tank 1 which faces the strainer 2 to thereby eliminate static electricity from lubricating oil or fuel 4 which flows into the strainer 2 by the self-discharge type static eliminator 10.

In this regard, as explained above, if discharge occurs between the air ions and the corner portion 13 of the self-discharge type static eliminator 10, as shown in FIG. 3B, air ions increased in amount of positive charge (shown by circles with ++ marks) are generated, and the air ions increased in amount of positive charge scatter in the surrounding air. The amount of air ions increased in amount of positive charge is extremely small compared with the amount of air which flows through the surroundings of the self-discharge type static eliminator 10. Note that, if the air around the self-discharge type static eliminator 10 stagnates and the air ions do not move, discharge does not continuously occur and the action of static elimination of the lubricating oil or fuel does not occur. That is, to perform the action of elimination of static electricity from the lubricating oil or fuel, it becomes necessary to make the air around the self-discharge type static eliminator 10 flow.

Discharge between the air ions and the self-discharge type static eliminator 10 occurs between the air ion and the corner portion 13 of the self-discharge type static eliminator 10 or between the air ions and the sharp projections 14 at the peripheral parts of the self-discharge type static eliminator 10. Therefore, to make it easier for discharge to occur between the air ions and the self-discharge type static eliminator 10, it can be said to be preferable to form a large number of sharp projections 14 in addition to the corner portion 13 at the peripheral parts of the self-discharge type static eliminator 10. Therefore, when preparing the self-discharge type static eliminator 10, if cutting large dimension metal foil to prepare the metal foil 11, it is preferable to cut the metal foil so that burrs like sharp projections 14 occur at the cut surface.

The metal foil 11 of the self-discharge type static eliminator 10 which is shown in FIG. 2A and FIG. 2B is comprised of a ductile metal, for example, aluminum or copper. In this embodiment according to embodiments of the present invention, the metal foil 11 is comprised of aluminum foil. Further, the length in the long direction of the aluminum foil 11 which is used in this embodiment according to the present invention is 50 mm to 100 mm or so, while the thickness is 0.05 mm to 0.2 mm or so. Note that it is also possible to cut and use aluminum tape comprised of aluminum foil 11 formed with a layer of a conductive adhesive 12 as the self-discharge type static eliminator 10.

On the other hand, even when the bottom wall 6 of the tank 1 is formed from a nonconductive plastic material, as shown in FIG. 1, if placing the self-discharge type static eliminator 10 on the outside surface 8 of the bottom wall 6 of the tank 1 which outside surface 8 corresponds to the back side of the inside surface 7 of the bottom wall 6 of the tank 1 which inside surface 7 faces the strainer 2, it is possible to eliminate static electricity from the lubricating oil or fuel. In this case, the static elimination mechanism which is presumed to occur at the bottom wall 6 of the tank 1 will be simply explained with reference to FIG. 4A shown in the same way as FIG. 3A.

Figure 4A:
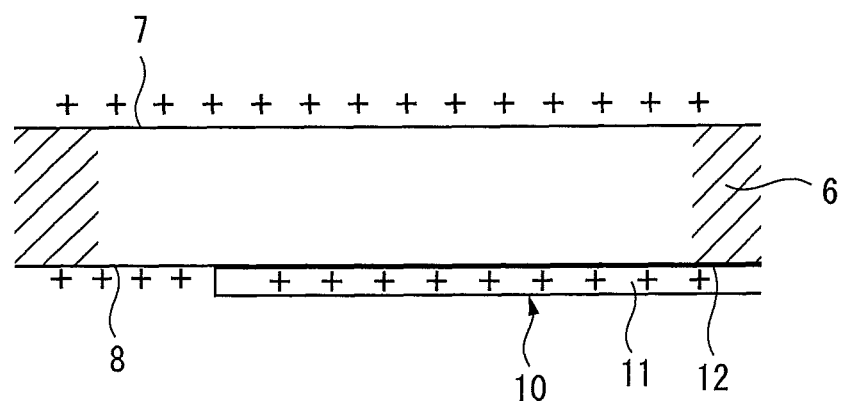
FIGS. 4A and 4B are views for explaining a static elimination action.

When the bottom wall 6 of the tank 1 is formed from a nonconductive plastic material, as shown in FIG. 4A, the inside of the bottom wall 6 does not carry a charge, but the surface of the bottom wall 6 carries a positive charge. Note that, at this time, the inside of the metal foil 11, that is, the inside of the self-discharge type static eliminator 10, carries a positive charge. In this case, the voltage of the self-discharge type static eliminator 10 becomes substantially equal to the voltage of the outside surface 8 of the bottom wall 6 around the self-discharge type static eliminator 10. Therefore, the voltage of the self-discharge type static eliminator 10 becomes considerably high. Therefore, in this case as well, the potential of the self-discharge type static eliminator 10 becomes considerably higher than the potential of the air ions. Therefore, as shown in FIG. 3B, discharge occurs between the air ions and the corner portion 13 of the self-discharge type static eliminator 10.

Figure 4B:
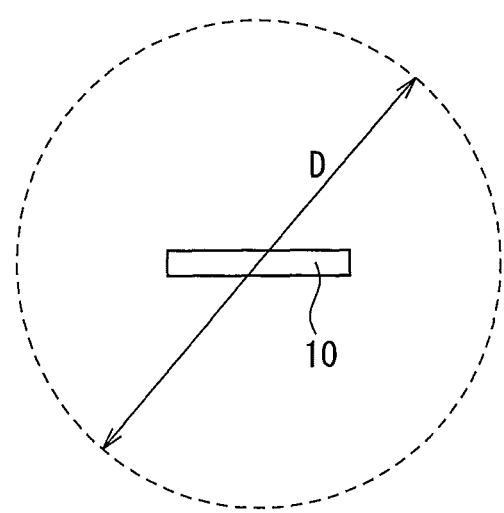

If discharge occurs between the air ions and the corner portion 13 of the self-discharge type static eliminator 10 and the amount of positive charge carried at the self-discharge type static eliminator 10 decreases, the positive charge carried on the outside surface 8 of the bottom wall 6 around the self-discharge type static eliminator 10 moves to the inside of the self-discharge type static eliminator 10, therefore the positive charge which is carried on the outside surface 8 of the bottom wall 6 around the self-discharge type static eliminator 10 decreases. As a result, the voltage of the self-discharge type static eliminator 10 and the outside surface 8 of the bottom wall 6 around the self-discharge type static eliminator 10 gradually falls. This action of reduction of the voltage of the self-discharge type static eliminator 10 and the outside surface 8 of the bottom wall 6 around the self-discharge type static eliminator 10 continues until the voltage of the self-discharge type static eliminator 10 becomes lower and the discharge action stops. As a result, as shown in FIG. 4B, the voltage of the outside surface 8 of the bottom wall 6 in the limited range D, which is shown by the broken line centered around the location of placement of the self-discharge type static eliminator 10, falls.

On the other hand, at this time, the voltage at the inside surface 7 of the bottom wall 6 in the limited range D centered around the location of placement of the self-discharge type static eliminator 10 also falls. However, in this case, the amount of drop of the voltage of the inside surface 7 of the bottom wall 6 is smaller than the amount of drop of the voltage of the outside surface 8 of the bottom wall 6. In this way, even if placing the self-discharge type static eliminator 10 on the outside surface 8 of the bottom wall 6, the voltage of the inside surface 7 of the bottom wall 6 drops because the drop in voltage at the outside surface 8 of the bottom wall 6 probably appears at the inside surface 7 of the bottom wall 6 as a drop in voltage of the inside surface 7 of the bottom wall 6.

If the voltage of the inside surface 7 of the bottom wall 6 falls, the voltage of the lubricating oil or fuel 4 which flows along the inside surface 7 of the bottom floor 6 falls and therefore the voltage of the lubricating oil or fuel 4 which flows into the strainer 2 falls. The voltage of the lubricating oil or fuel 4 falling in this way means the fall of the amount of charge which is carried at the lubricating oil or fuel 4, therefore in this case as well, static electricity is eliminated from the entire lubricating oil or fuel 4 which flows into the strainer 2.

On the other hand, if placing the self-discharge type static eliminator 10 on the outside surface of the pump 3, static electricity is eliminated from the lubricating oil or fuel which flows through the inside of the pump 3. Therefore, in this case as well, the viscosity of the lubricating oil or fuel is reduced. As a result, at the time of engine operation, the lubricating oil or fuel is fed to the required locations with a good response, so the operating response of the engine is improved. Therefore, in one embodiment according to the present invention, as shown in FIG. 1, the self-discharge type static eliminator 10 is placed on the outside surface of the pump 3. In this case, as the location for placement of the self-discharge type static eliminator 10, a location where surrounding air flows, that is, the outside surface of the pump 3 which is exposed to the outside of the tank 1, can be said to be preferable.

Further, if placing the self-discharge type static eliminator 10 on the outside surface of the flow pipe 5, static electricity is eliminated from the lubricating oil or fuel which flows through the inside of the flow pipe 5. Therefore, in this case as well, the viscosity of the lubricating oil or fuel is reduced and, as a result, at the time of engine operation, lubricating oil or fuel is fed to the required locations with a good response, so the operating response of the engine is improved. Therefore, in one embodiment according to the present invention, as shown in FIG. 1, the self-discharge type static eliminator 10 is placed on the outside surface of the flow pipe 5. In this case as well, this location for placement of the self-discharge type static eliminator 10, a location where surrounding air flows (i.e., the outside surface of the flow pipe 5 which is exposed to the outside of the tank 1) can be said to be preferable.

The invention claimed is:

1. A feed system of one of lubricating oil or fuel of a vehicle, comprising:
    a tank which stores a lubricating oil or fuel and has a bottom wall formed from a nonconductive plastic material,
    a strainer for lubricating oil or fuel, which is arranged at a bottom portion of the tank, said tank, the nonconductive bottom wall of said tank and the lubricating oil or fuel which is stored in said tank carrying a positive charge, and
    a self-discharge type static eliminator to lower an amount of charge carried on a wall surface of the nonconductive bottom wall of said tank in a limited range centered at a location of placement of said static eliminator, said self-discharge type static eliminator being placed on an outer side surface of the nonconductive bottom wall of said tank which corresponds to a back side of an inside surface of the nonconductive bottom wall of said tank which faces said strainer to thereby eliminate static electricity from lubricating oil or fuel which flows into said strainer by said self-discharge type static eliminator, wherein the width of said self-discharge type static eliminator does not vertically exceed the width of said strainer.

2. The feed system of lubricating oil or fuel of a vehicle as claimed in claim 1, further comprising a pump for sucking lubricating oil or fuel from a bottom portion of an inside of the tank through said strainer, and said self-discharge type static eliminator is placed on an outside surface of said pump.

3. The feed system of lubricating oil or fuel of a vehicle as claimed in claim 1, further comprising a flow pipe through which lubricating oil or fuel which is sucked from a bottom portion of an inside of the tank through said strainer, and said self-discharge type static eliminator is placed on an outside surface of said flow pipe.

4. The feed system of lubricating oil or fuel of a vehicle as claimed in claim 1, wherein said self-discharge type static eliminator has corner portions to generate self-discharge.

5. The feed system of lubricating oil or fuel of a vehicle as claimed in claim 1, wherein said self-discharge type static eliminator has an elongated rectangular planar shape.

6. The feed system of lubricating oil or fuel of a vehicle as claimed in claim 2, further comprising a flow pipe through which lubricating oil or fuel which is sucked from a bottom portion of an inside of the tank through said strainer, and said self-discharge type static eliminator is placed on an outside surface of said flow pipe.

7. The feed system of lubricating oil or fuel of a vehicle as claimed in claim 2, wherein said self-discharge type static eliminator is comprised of metal foil which is bonded to the outside surface of the bottom wall of the tank by a conductive adhesive.

8. The feed system of lubricating oil or fuel of a vehicle as claimed in claim 7, wherein said self-discharge type static eliminator has corner portions to generate self-discharge.

9. The feed system of lubricating oil or fuel of a vehicle as claimed in claim 7, wherein said self-discharge type static eliminator has an elongated rectangular planar shape.

10. The feed system of lubricating oil or fuel of a vehicle as claimed in claim 3, wherein said self-discharge type static eliminator is comprised of metal foil which is bonded to the outside surface of the bottom wall of the tank by a conductive adhesive.

11. The feed system of lubricating oil or fuel of a vehicle as claimed in claim 10, wherein said self-discharge type static eliminator has corner portions to generate self-discharge.

12. The feed system of lubricating oil or fuel of a vehicle as claimed in claim 10, wherein said self-discharge type static eliminator has an elongated rectangular planar shape.

* * * * *